(12) United States Patent
Hogan et al.

(10) Patent No.: US 11,891,251 B2
(45) Date of Patent: Feb. 6, 2024

(54) RAISED BELT TRANSFER UNIT

(71) Applicant: FMH Conveyors LLC, Jonesboro, AR (US)

(72) Inventors: William Mark Hogan, Virginia Beach, VA (US); Barry Wayne Freeman, Norfolk, VA (US)

(73) Assignee: FMH Conveyors LLC, Jonesboro, AR (US)

( * ) Notice: Subject to any disclaimer, the term of this patent is extended or adjusted under 35 U.S.C. 154(b) by 69 days.

(21) Appl. No.: 17/533,412

(22) Filed: Nov. 23, 2021

(65) Prior Publication Data

US 2022/0162009 A1 May 26, 2022

Related U.S. Application Data

(60) Provisional application No. 63/117,627, filed on Nov. 24, 2020.

(51) Int. Cl.
| | |
|---|---|
| *B65G 37/00* | (2006.01) |
| *B65G 13/07* | (2006.01) |
| *B65G 21/12* | (2006.01) |
| *B65G 47/56* | (2006.01) |
| *B65G 21/14* | (2006.01) |

(52) U.S. Cl.
CPC .......... *B65G 37/005* (2013.01); *B65G 13/07* (2013.01); *B65G 21/12* (2013.01); *B65G 47/56* (2013.01); *B65G 21/14* (2013.01)

(58) Field of Classification Search
CPC .... B65G 37/005; B65G 13/07; B65G 13/071; B65G 13/072; B65G 13/11; B65G 13/12; B65G 21/12; B65G 47/56; B65G 21/14
See application file for complete search history.

(56) References Cited

U.S. PATENT DOCUMENTS 1,967,747 A * 7/1934 Eggleston ............ B65G 13/071
198/787
4,319,675 A * 3/1982 Turnbough ............ B65G 13/07
198/367

(Continued)

FOREIGN PATENT DOCUMENTS

CN 206156406 U 5/2017
CN 207917904 U 9/2018

(Continued)

OTHER PUBLICATIONS

International Search Report and Written Opinion for Application No. PCT/US2021/060449 dated Feb. 9, 2022 (15 pages).

*Primary Examiner* — Mark A Deuble

(74) *Attorney, Agent, or Firm* — Michael Best & Friedrich LLP

(57) ABSTRACT

A raised belt transfer unit may comprise a first angled support and a second angled support, a drive roller rotatably mounted to the first angled support and the second angled support, a plurality of driven rollers rotatably mounted to the first angled support and the second angled support, and a drive connecter in communication with the drive roller and a driven roller. The drive roller may be positioned adjacent a lower end of the first support and adjacent a lower end of the second support. The drive roller may be adapted to be coupled to a conveyor belt of a telescopic conveyor.

19 Claims, 19 Drawing Sheets

(56) References Cited

U.S. PATENT DOCUMENTS

| | | | |
|---|---|---|---|
| 4,332,608 A * | 6/1982 | Rhonehouse | B65G 13/07 |
| | | | 65/348 |
| 5,096,045 A * | 3/1992 | Feldl | B65G 21/06 |
| | | | 198/816 |
| 5,632,371 A * | 5/1997 | Best | B65G 13/07 |
| | | | 193/35 TE |
| 5,692,593 A * | 12/1997 | Ueno | B23Q 7/03 |
| | | | 198/464.1 |
| 6,481,563 B1 | 11/2002 | Gilmore | |
| 6,609,607 B2 | 8/2003 | Woltjer et al. | |
| 7,461,043 B2 * | 12/2008 | Hess | G06F 9/44505 |
| | | | 715/764 |
| 7,963,388 B2 * | 6/2011 | Eubanks | B65G 13/07 |
| | | | 198/780 |
| 8,622,199 B2 | 1/2014 | Windfeld et al. | |
| 8,966,864 B2 | 3/2015 | Rabec | |
| 9,156,627 B2 * | 10/2015 | Mathi | B65G 13/073 |
| 9,604,787 B1 | 3/2017 | Baek | |
| 10,246,267 B2 | 4/2019 | Ragan | |
| 2020/0331702 A1 | 10/2020 | Sachs | |
| 2022/0306393 A1 * | 9/2022 | Hogan | B65G 15/00 |

FOREIGN PATENT DOCUMENTS

| | | |
|---|---|---|
| CN | 110356776 A | 10/2019 |
| KR | 20190118468 A | 10/2019 |

* cited by examiner

RAISED BELT TRANSFER UNIT

CROSS-REFERENCE TO RELATED APPLICATION(S)

This application claims priority to U.S. Provisional Application No. 63/117,627, filed Nov. 24, 2020, which is hereby incorporated in its entirety.

FIELD OF THE DISCLOSURE

The present disclosure relates to raised belt transfer units. Exemplary raised belt transfer units are particularly suited for extendable conveyors that may be used during material loading/unloading.

INTRODUCTION

Conventional raised belt transfers may be used on telescopic conveyors to raise the belt above the conveyor slider bed so that the belt may mate up to an incline/takeaway conveyor positioned over the telescopic conveyor. The telescopic belt loops through a series of pulleys on traditional raised belt transfers to accomplish this. Traditional raised belt transfers are used for unloading operations only.

SUMMARY OF THE DISCLOSURE

In one aspect, a raised belt transfer unit is disclosed. The raised belt transfer unit may comprise a first angled support and a second angled support, a drive roller rotatably mounted to the first angled support and the second angled support, a plurality of driven rollers rotatably mounted to the first angled support and the second angled support, and a drive connecter in communication with the drive roller and a driven roller. The drive roller may be positioned adjacent a lower end of the first support and adjacent a lower end of the second support. The drive roller may be adapted to be coupled to a conveyor belt.

In another aspect, a telescopic conveyor system is disclosed. The telescopic conveyor system may comprise a telescopic conveyor comprising a conveyor belt and a raised belt transfer unit mounted to the telescopic conveyor. The raised belt transfer unit may comprise a first angled support and a second angled support, a drive roller rotatably mounted to the first angled support and the second angled support, a plurality of driven rollers rotatably mounted to the first angled support and the second angled support, and a drive connecter in communication with the drive roller and a driven roller. The drive roller may be positioned adjacent a lower end of the first support and adjacent a lower end of the second support. The drive roller may be coupled to a conveyor belt.

In another aspect, a method for conveying material from a load site to a delivery site with a telescopic conveyor system is disclosed. The method may comprise receiving material on a slider bed of a telescopic conveyor in the telescopic conveyor system, conveying the material, on a conveyor belt of the telescopic conveyor, to a raised belt transfer unit, and providing the material to a raised belt transfer unit. The raised belt transfer unit may comprise a first angled support and a second angled support, a drive roller rotatably mounted to the first angled support and the second angled support, a plurality of driven rollers rotatably mounted to the first angled support and the second angled support, and a drive connecter in communication with the drive roller and a driven roller. The drive roller may be positioned adjacent a lower end of the first support and adjacent a lower end of the second support. The drive roller may be coupled to the conveyor belt.

In another aspect, a method for conveying material from a first location to a loading site with a telescopic conveyor is disclosed. The method may comprise receiving material on a raised belt transfer unit from a first conveyor, providing the material from the raised belt transfer unit to a telescopic conveyor, the telescopic conveyor being positioned lower than the first conveyor; receiving the material on a conveyor belt of the telescopic conveyor; and conveying the material, on the conveyor belt, to the loading site. The raised belt transfer unit may comprise a first angled support and a second angled support, a drive roller rotatably mounted to the first angled support and the second angled support, a plurality of driven rollers rotatably mounted to the first angled support and the second angled support, and a drive connecter in communication with the drive roller and a driven roller. The drive roller may be positioned adjacent a lower end of the first support and adjacent a lower end of the second support. The drive roller may be coupled to the conveyor belt.

Other aspects of the disclosure will become apparent by consideration of the detailed description and accompanying drawings.

Before any embodiments of the disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

DETAILED DESCRIPTION

Systems and methods disclosed herein relate to raised belt transfer units. Traditional raised belt transfers (RBTs) have a telescopic belt routed through a series of pulleys, so the raised belt transfer must be installed when the telescopic conveyor is manufactured. Should the customer ever desire to remove the RBT, the belt must be broken and shortened to remove the excess belt. Should an RBT be added after shipment, an extra section of belt must be added to the telescopic conveyor. Additionally, in order to provide sufficient height to mate up to the incline conveyor in a traditional RBT, the belt travels for a significant distance above the telescopic slider bed which can cause belt tracking issues, especially when packages are loaded toward an edge of the belt.

Generally, instantly disclosed raised belt transfer units utilize a roller bed, rather than a belt, to convey packages from the telescopic slider bed to the incline conveyor. The roller bed is friction driven by the telescopic belt. Further, the telescopic belt raises less than 5 centimeters above the stage 1 slider bed versus about 20 centimeters or more for a traditional configuration. Because the driven roller is closer to the slider bed, the gap from the belt to the Stage 1 slider bed is reduced to the point that heavy packages loaded toward the edge of the belt have less of an effect on telescopic belt tracking. Because the driven roller is closer to the slider bed, exemplary raised belt transfer units disclosed herein can either be removed or added to a unit already shipped without an RBT because this minimal amount of belt rise can be accommodated by the belt adjustments already present in the telescopic conveyor.

Figure 1:
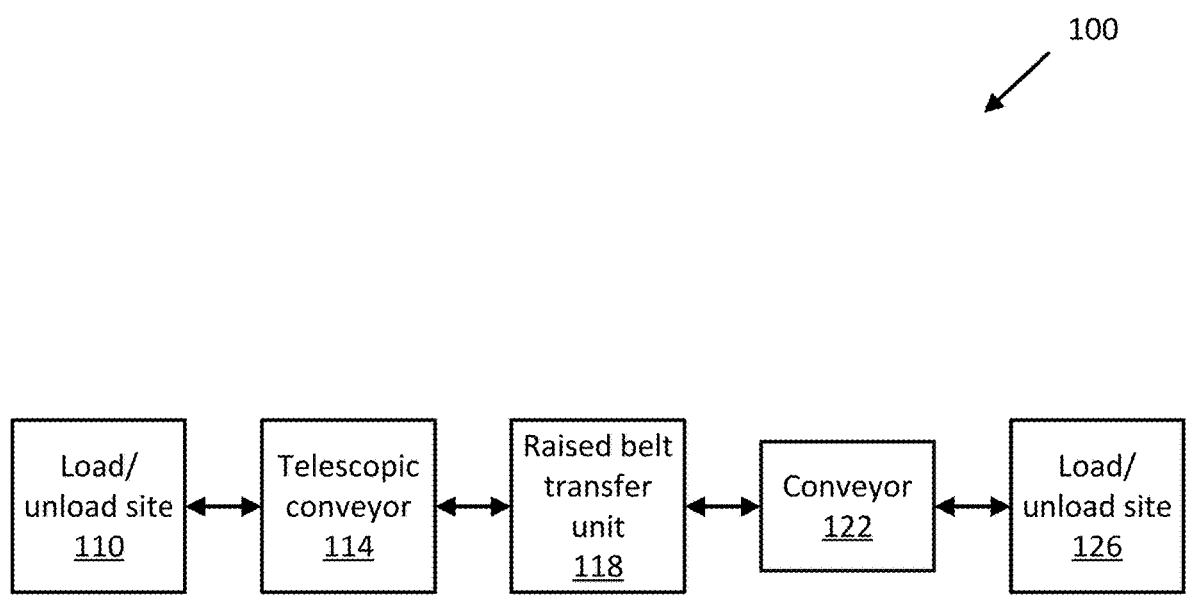
FIG. 1 is a schematic depiction of an exemplary material handling system.

FIG. 1 is a schematic depiction of an exemplary material handling system 100. System 100 includes load/unload site 110, telescopic conveyor 114, raised belt transfer unit 118, conveyor 122, and load/unload site 126. Other embodiments can include more or fewer components.

In an exemplary implementation, material, such as packages, can be unloaded from load/unload site 110 and provided to telescopic conveyor 114. The material is conveyed by telescopic conveyor 114 to raised belt transfer unit 118. In turn, raised belt transfer unit 118 provides the material to conveyor 112 that provides the material to load/unload site 126. In some implementations, material may be conveyed in the opposite direction: from load/unload site 126 to conveyor 122, from conveyor 122 to raised belt transfer unit 118, from raised belt transfer unit 118 to telescopic conveyor 114, and from telescopic conveyor 114 to load/unload site 110.

In various implementations, load/unload site 110 may be a fixed or a movable load site. As an example, load/unload site 110 may be a trailer of a semi-truck. In various implementations, load/unload site 126 may be a fixed or movable load site. As examples, load/unload site 126 may be a storage facility, warehouse, fulfillment center, or distribution facility. Other possibilities are contemplated.

In a typical implementation, load/unload site 110 is positioned relatively lower than load/unload site 126. Accordingly, material unloaded from load/unload site 110 travels relatively upwards via telescopic conveyor 114, raised belt transfer unit 118, and/or incline conveyor 112. Conversely, when material is provided starting from load/unload site 126, material travels relatively downward. In various implementations, conveyor 122 may be relatively level or an inclined conveyor.

Figure 2:
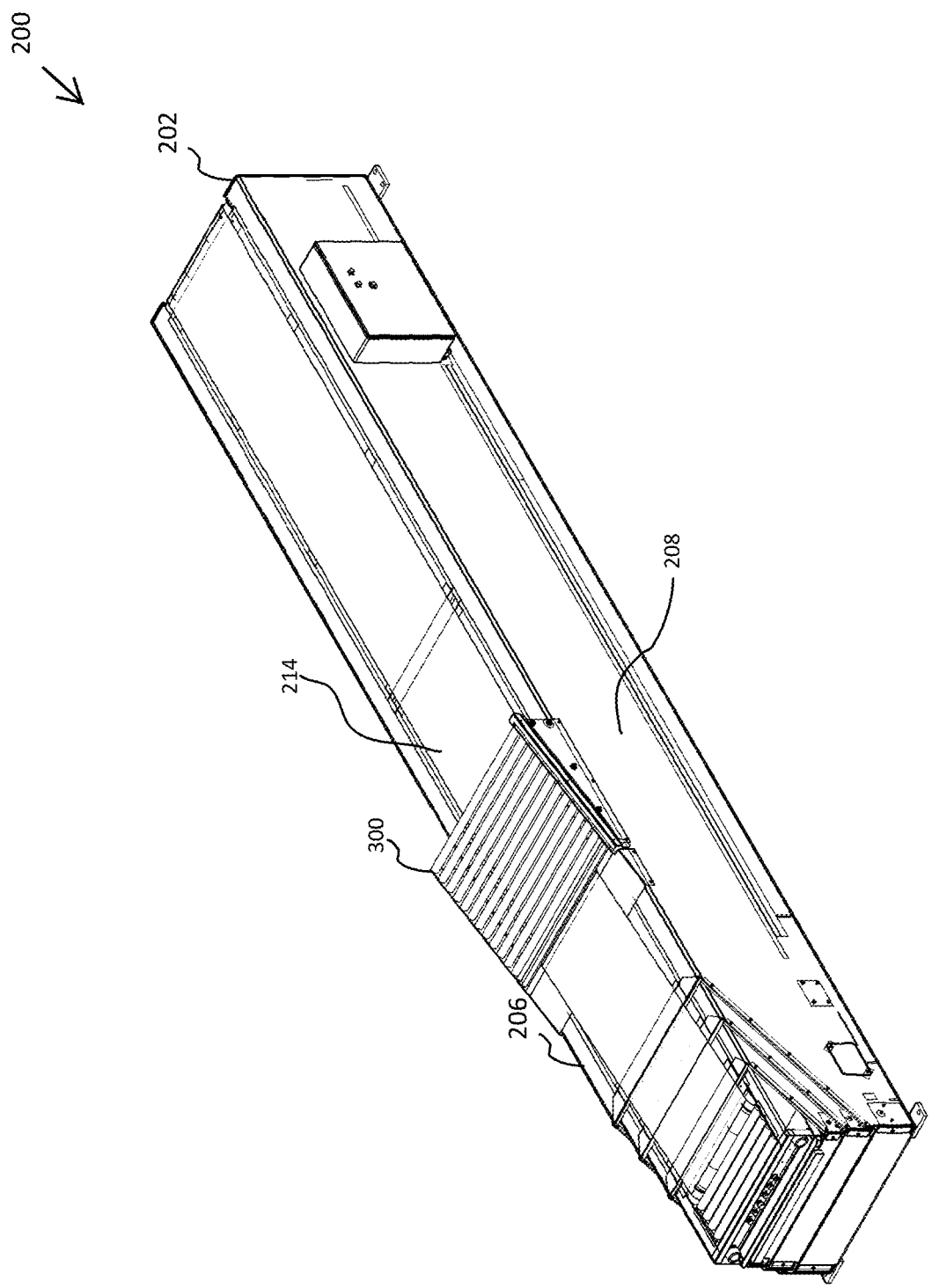
FIG. 2 is a front, top perspective view of an example embodiment of telescopic conveyor system.
Figure 3:
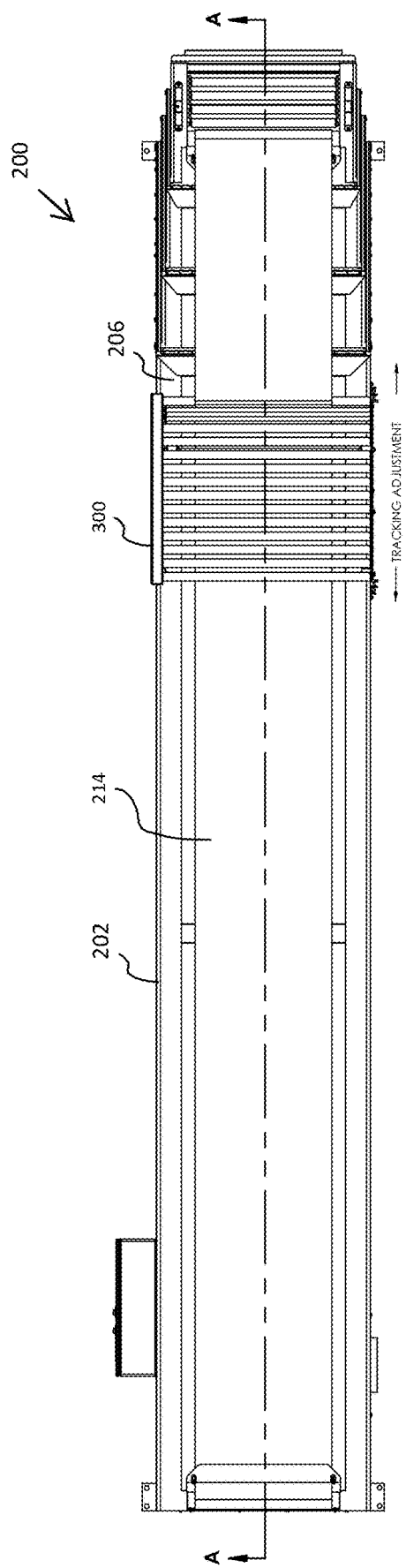
FIG. 3 is a top plan view of the telescopic conveyor system shown in FIG. 2.
Figure 4:
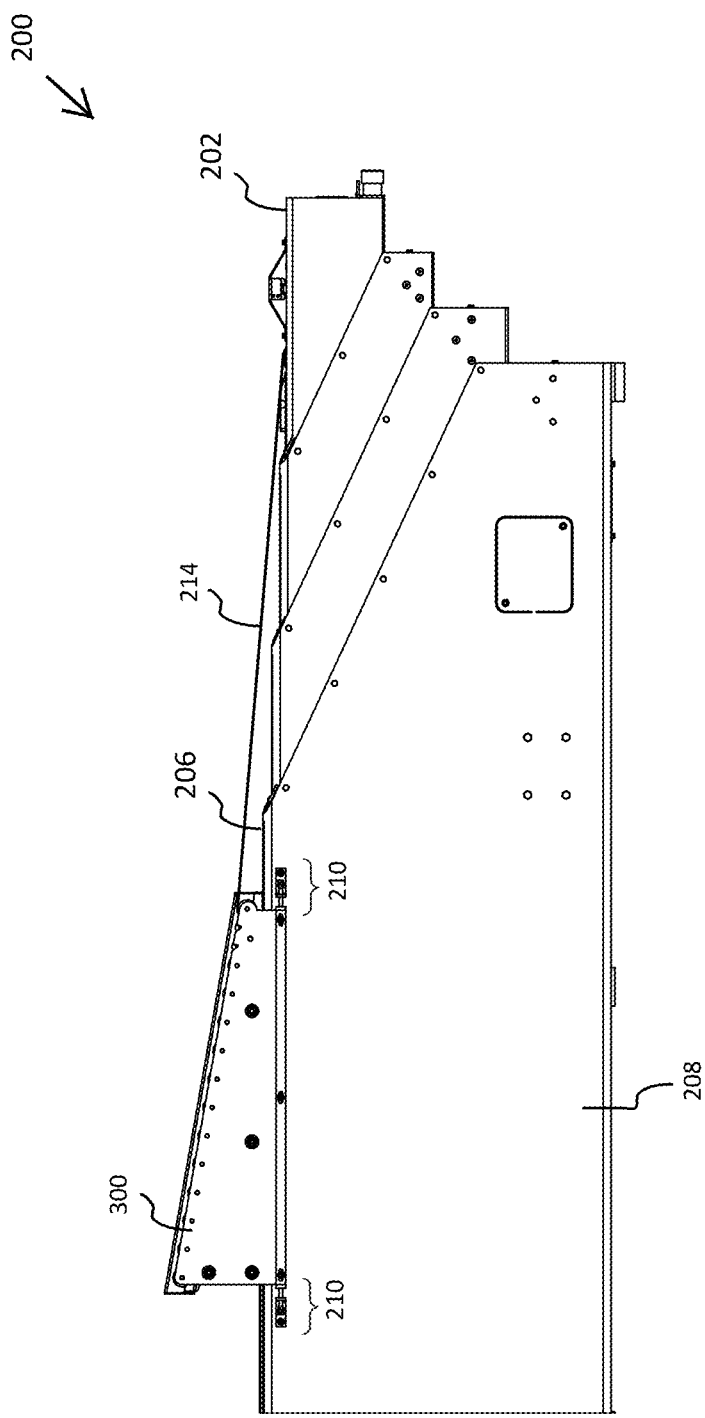
FIG. 4 is a left side plan view of the telescopic conveyor system shown in FIG. 2.
Figure 5A:
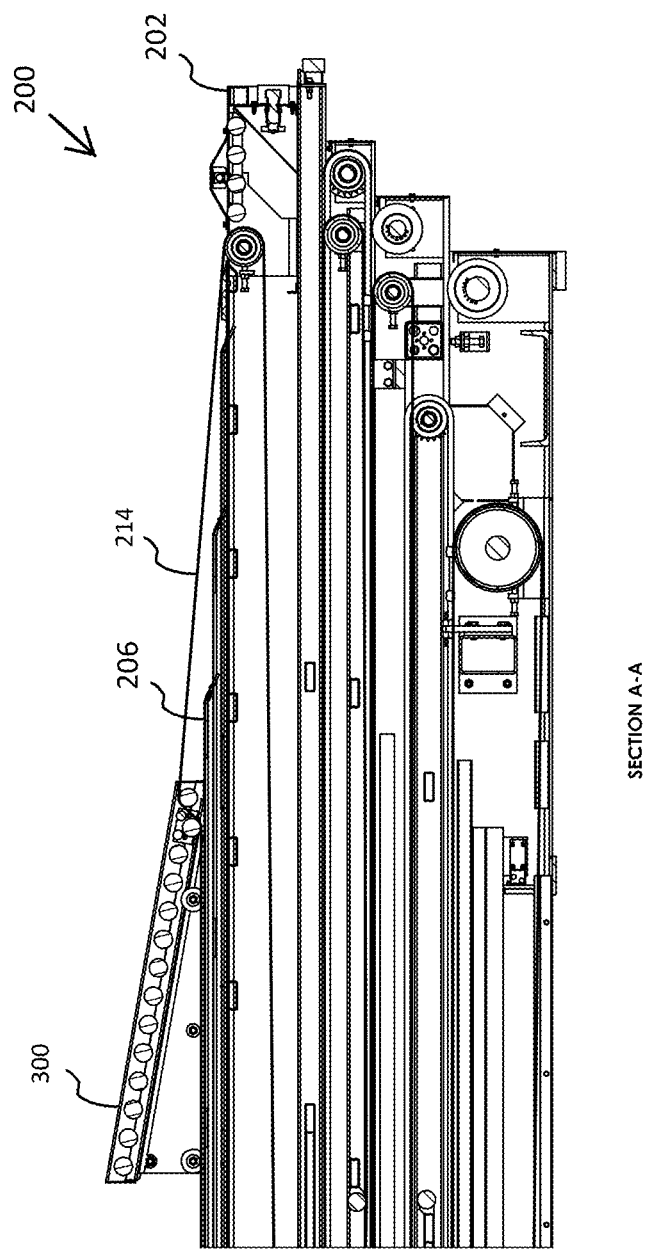
FIG. 5A is a left side sectional view of the telescopic conveyor system shown in FIG. 2.
Figure 5B:
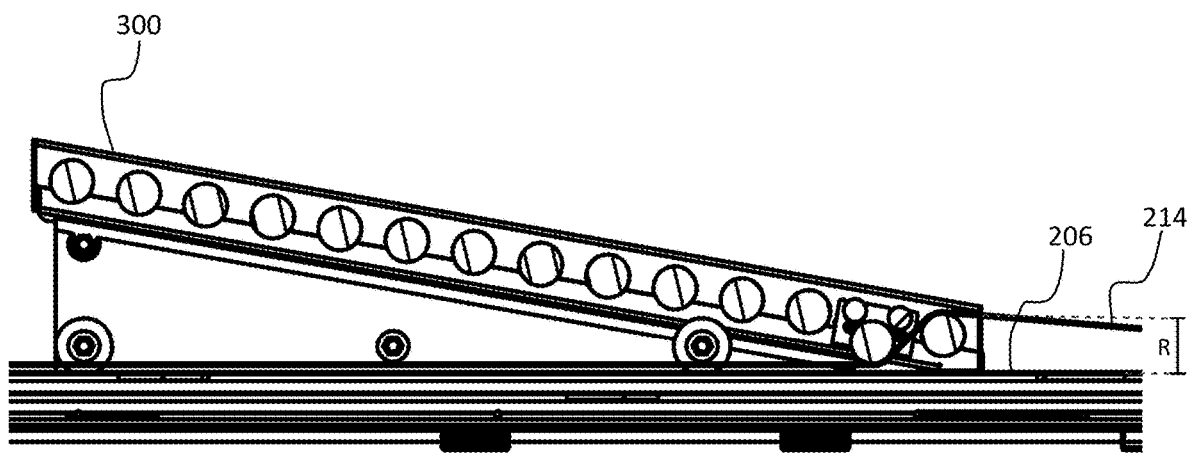
FIG. 5B shows an expanded view of a portion of FIG. 5A.

FIG. 2, FIG. 3, FIG. 4, FIG. 5A, and FIG. 5B show an example embodiment of telescopic conveyor system 200 and, unless indicated otherwise, are discussed concurrently below. FIG. 2 is a front, top perspective view; FIG. 3 is a top plan view; FIG. 4 is a left side plan view; and FIG. 5A is a left side sectional view and FIG. 5B shows a portion of FIG. 5A in greater detail. Telescopic conveyor system 200 is shown in a retracted configuration in each of the aforementioned Figures. Other embodiments may include more or fewer components.

Broadly, telescopic conveyor system 200 includes telescopic conveyor 202 and raised belt transfer unit 300. In some instances, telescopic conveyor 202 may be manufactured with raised belt transfer unit 300. In some instances, raised belt transfer unit 300 may be attached to telescopic conveyor 202 as an aftermarket modification.

Telescopic conveyor 202 provides an extendable surface that conveys material in one of two conveying directions. Telescopic conveyor 202 may extend from the position shown in FIG. 2, for instance, to an extended position into a load site, such as a semi-truck trailer. In some embodiments, the length by which the extendable conveyor 30 is extendable by is approximately 17 meters. Movement of the telescopic conveyor 202 between retracted and extended positions may be driven by one or more motors, such as a hydraulic motor or an electric motor. A commercially available example of telescopic conveyor 202 is the MaxxReach Telescopic Conveyors sold by FMH Conveyors (Jonesboro, Arkansas).

Conveyor belt 214 transports material along slider bed 206. Generally, slider bed 206 is the surface, or surfaces, of telescopic conveyor 202 that support conveyor belt 214. Depending on the extended position of the telescopic conveyor 202, slider bed 206 may comprise more than one stage of telescopic conveyor 202.

In the configuration shown in FIG. 2, conveyor belt 214 passes over a drive roller of the raised belt transfer unit 300, under a guide roller, and then continues along slider bed 206. The conveyor belt 214 may be driven by one or more motors. In some embodiments, the motor is a hydraulic motor and in other embodiments the motor may be an electric motor.

A rise R of conveyor belt 214 above slider bed 206 may be determined by the height of the drive roller of raised belt transfer unit 300. In various implementations, a maximum rise R of conveyor belt 214 above slider bed 206 is no more than 6 cm; no more than 5 cm; no more than 4.75 cm; no more than 4.5 cm; no more than 4.25 cm; or no more than 4 cm. By minimizing rise R, belt tracking issues may be reduced or eliminated.

Raised belt transfer unit 300 can be connected to the sides 218 of telescopic conveyor 202. Typically, raised belt transfer unit 300 is connected to the stationary stage (which may be termed "stage 1") of telescopic conveyor 202. In some instances, longitudinal adjustment assembly 210 connects raised belt transfer unit 300 to sides 218 of telescopic conveyor 202.

Longitudinal adjustment assembly 210 is configured to adjust a longitudinal position of raised belt transfer unit 300 relative to the telescopic conveyor 202. As used herein, "longitudinal position" means along a length direction of the conveyor belt or slider bed. Longitudinal adjustment assembly 210 may facilitate mating a secondary conveyor, such as an incline conveyor, to the raised belt transfer unit 300.

In an exemplary implementation, longitudinal adjustment assembly 210 may comprise a threaded aperture coupled to telescopic conveyor 202, a threaded aperture coupled to raised belt transfer unit 300, and a threaded connector passing through each of the threaded apertures. In some instances, a longitudinal adjustment assembly 210 may be positioned near a front portion of raised belt transfer unit 300 and near a rear portion of raised belt transfer unit 300. In some instances, longitudinal adjustment assemblies are positioned on both sides of telescopic conveyor 202. Other configurations of longitudinal adjustment assembly 210 are contemplated.

Figure 6:
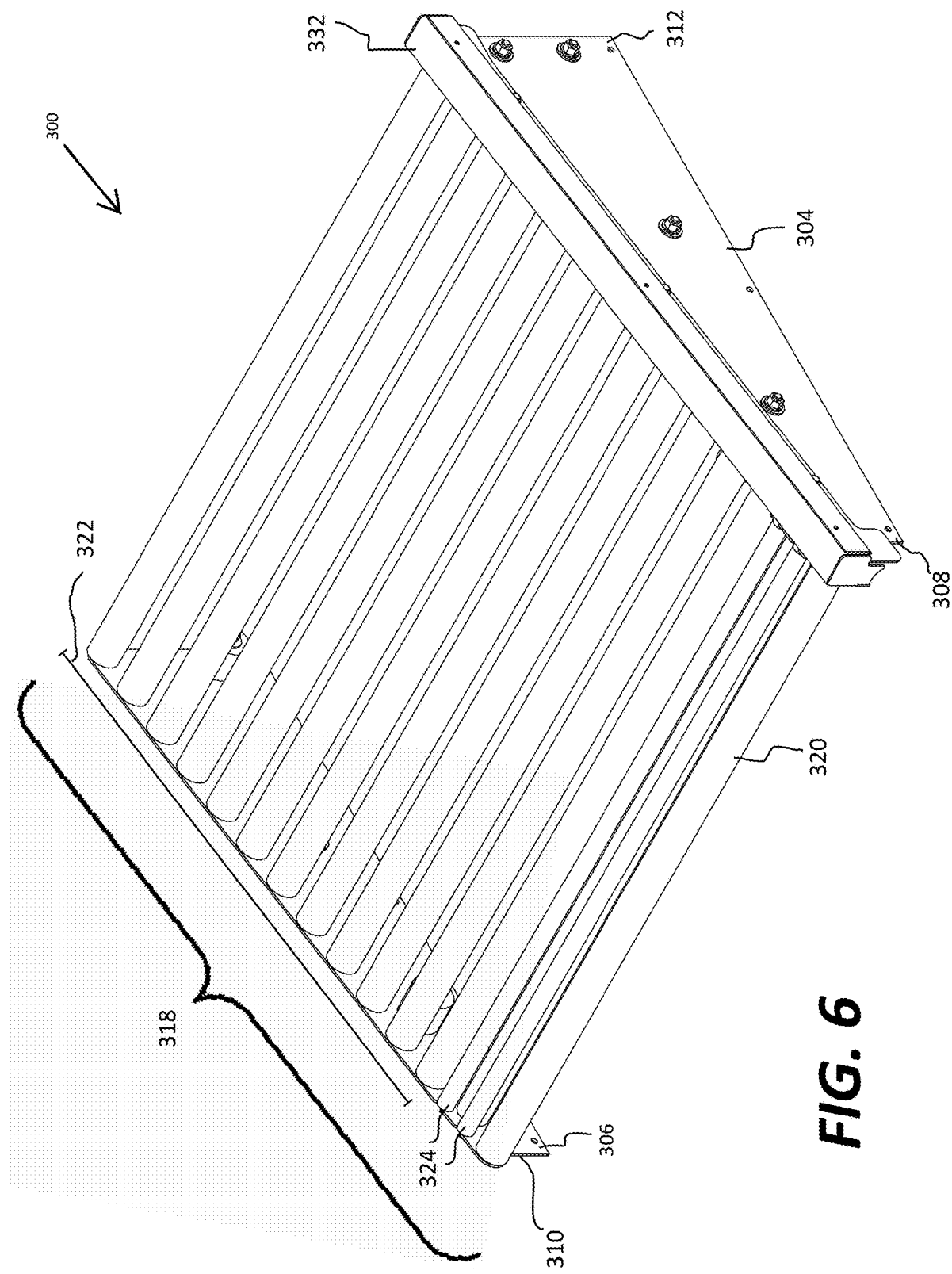
FIG. 6 is a top right perspective view of a raised belt transfer unit usable in the telescopic conveyor system shown in FIG. 2.
Figure 7:
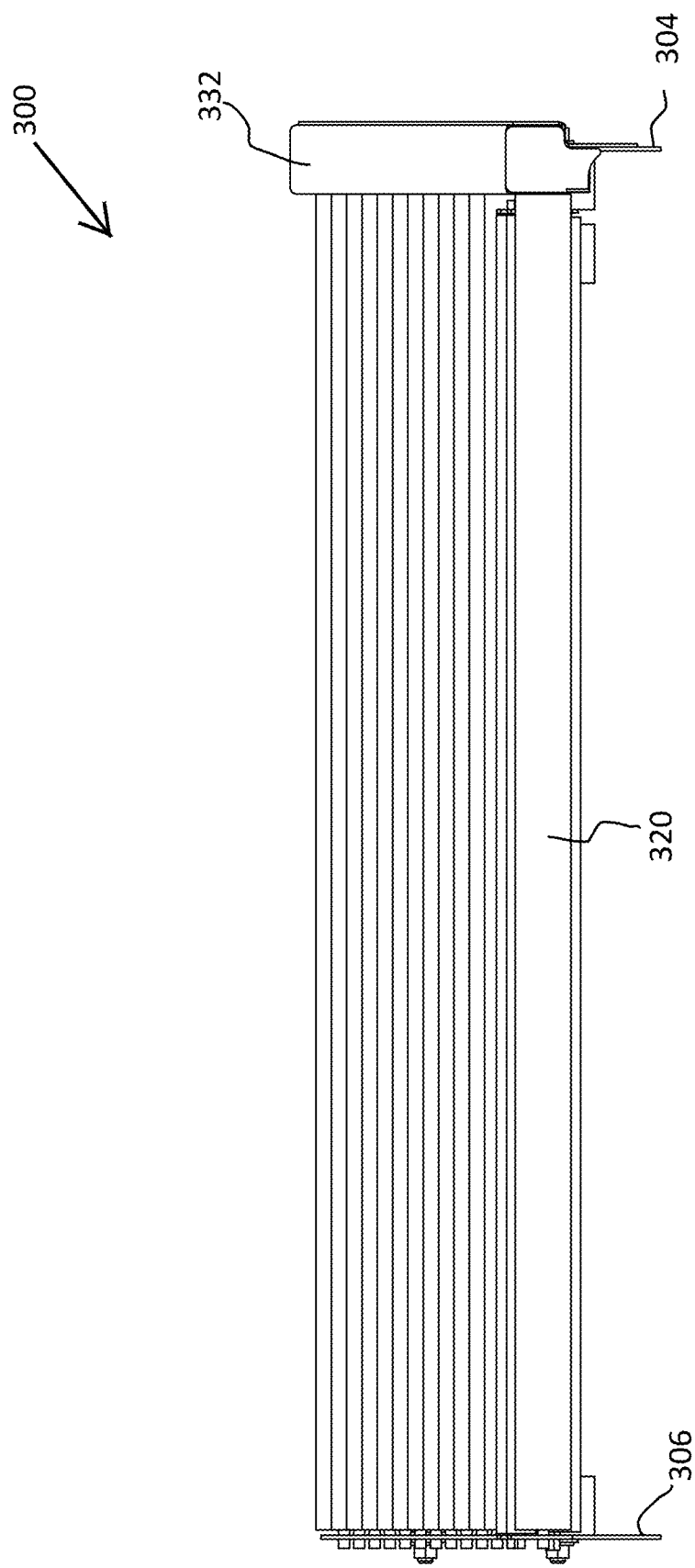
FIG. 7 is a front view of the raised belt transfer unit shown in FIG. 6.
Figure 8:
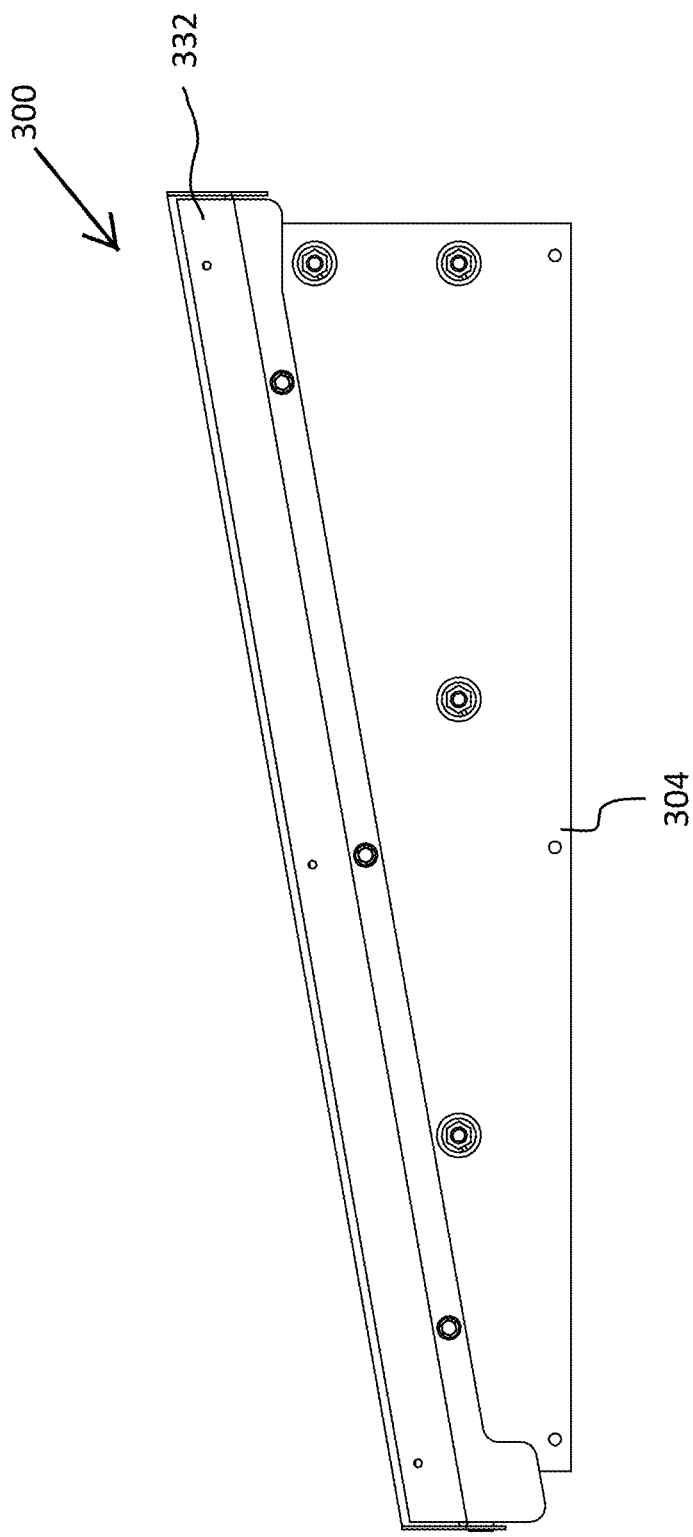
FIG. 8 is a right plan view of the raised belt transfer unit shown in FIG. 6.
Figure 9:
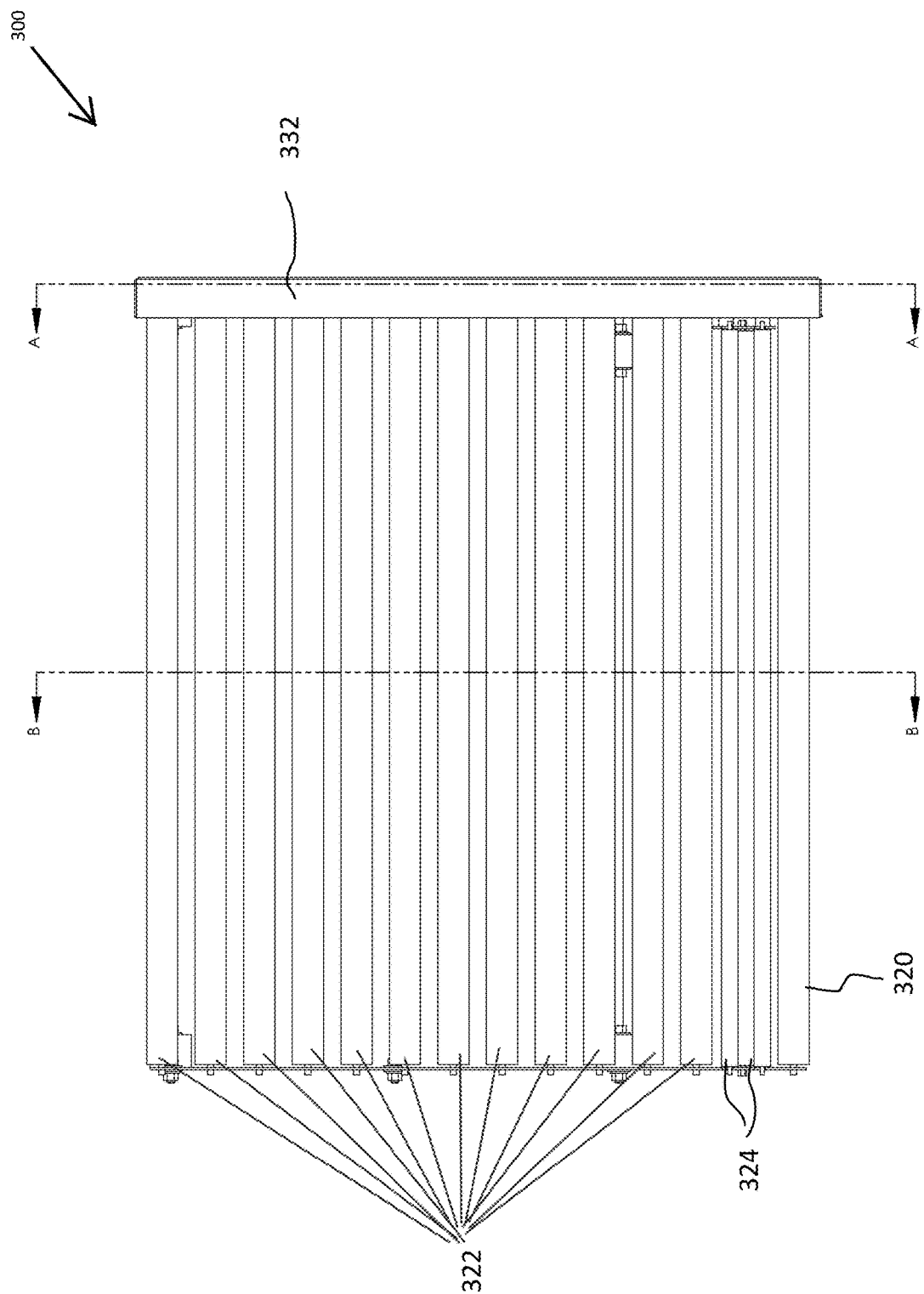
FIG. 9 is a top plan view of the raised belt transfer unit shown in FIG. 6.
Figure 10:
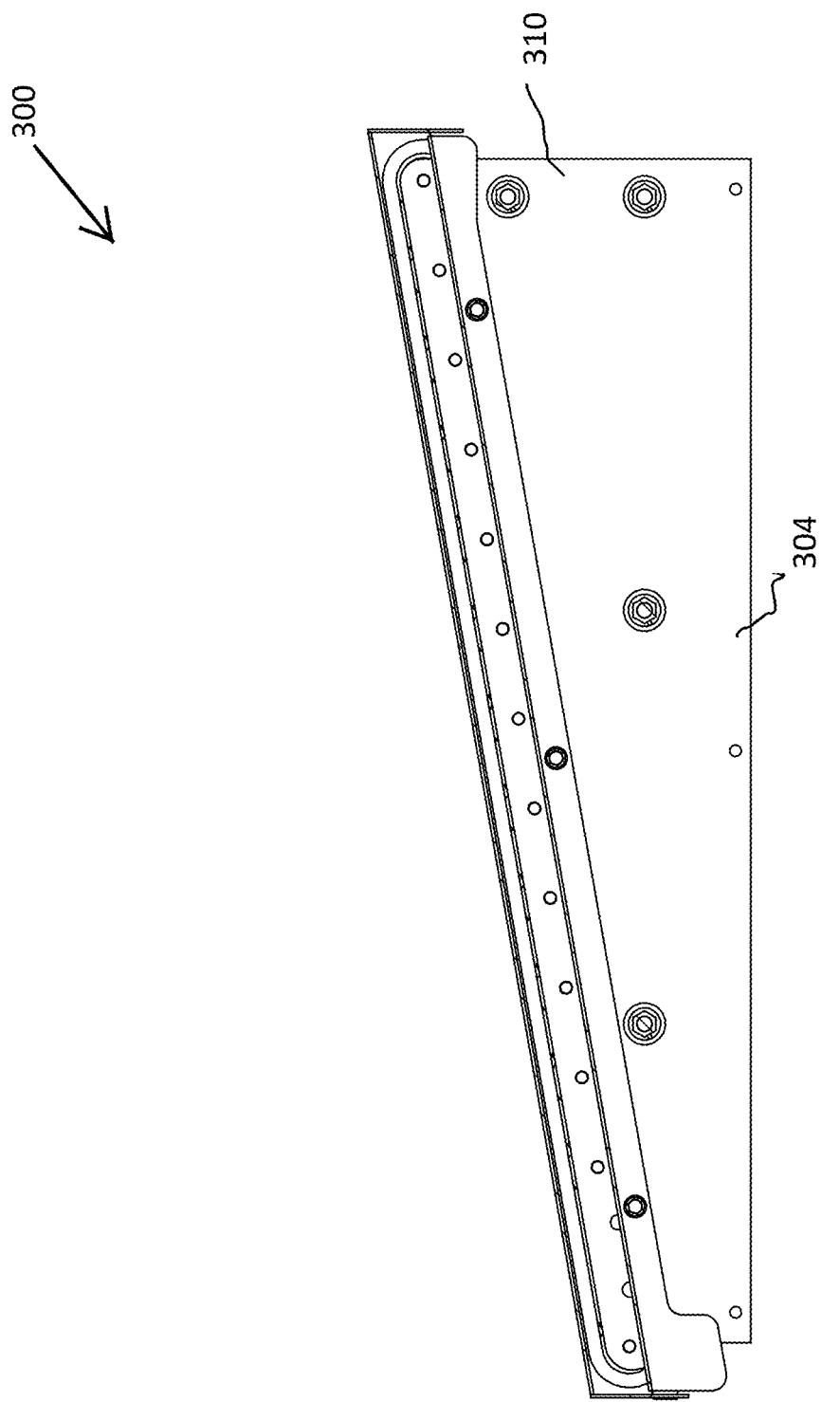
FIG. 10 is a right side sectional view of the raised belt transfer unit shown in FIG. 6 along line A-A shown in FIG. 9.
Figure 11:
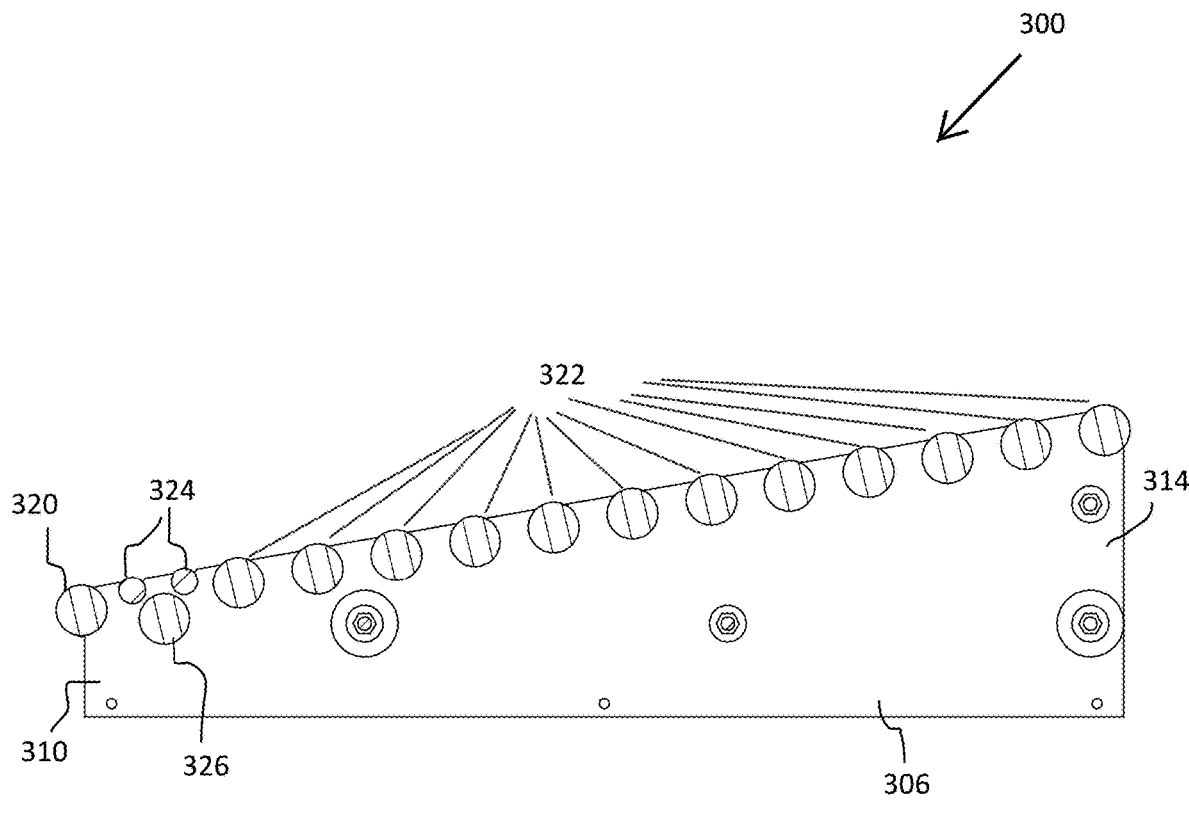
FIG. 11 is a right side sectional view of the raised belt transfer unit shown in FIG. 6 along line B-B shown in FIG. 9.
Figure 12:
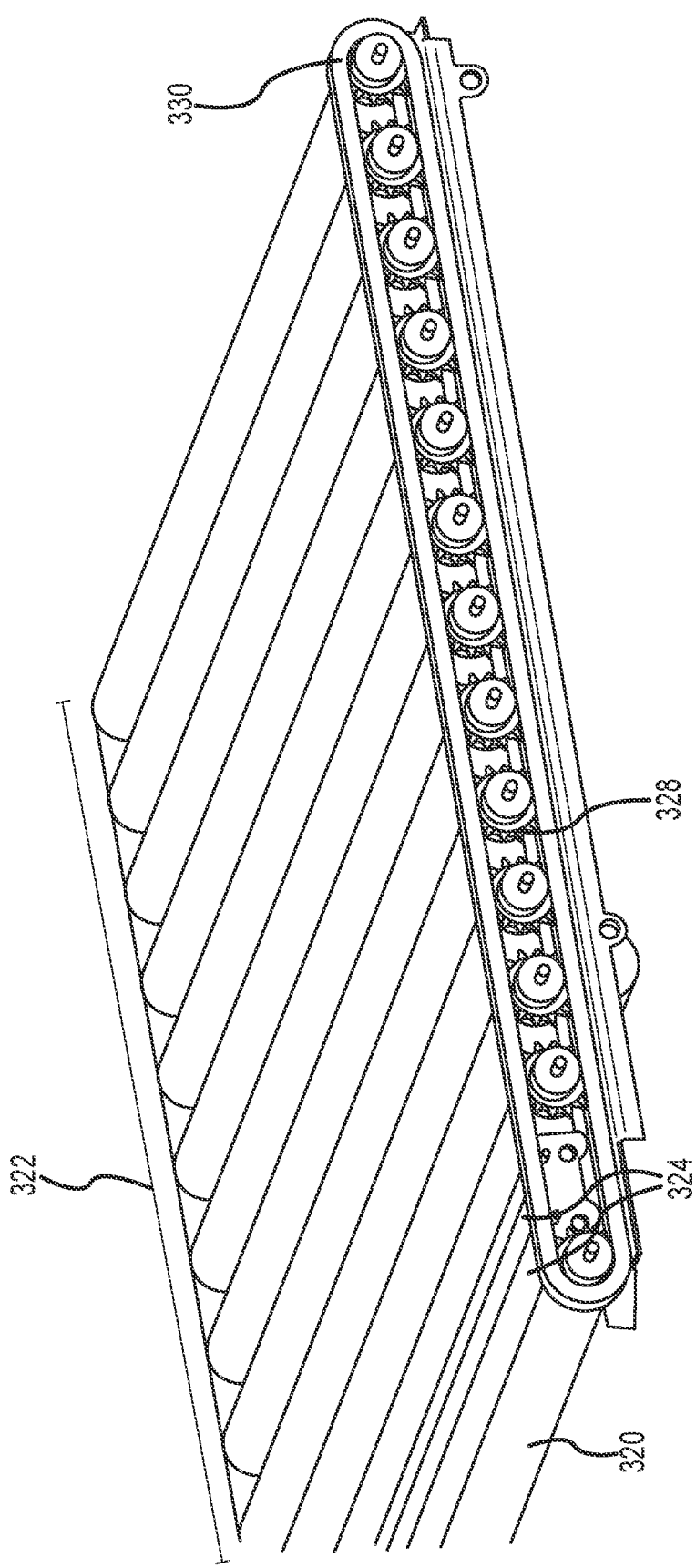
FIG. 12 is a right top perspective view of the raised belt transfer unit shown in FIG. 6 with certain components removed.
Figure 13:
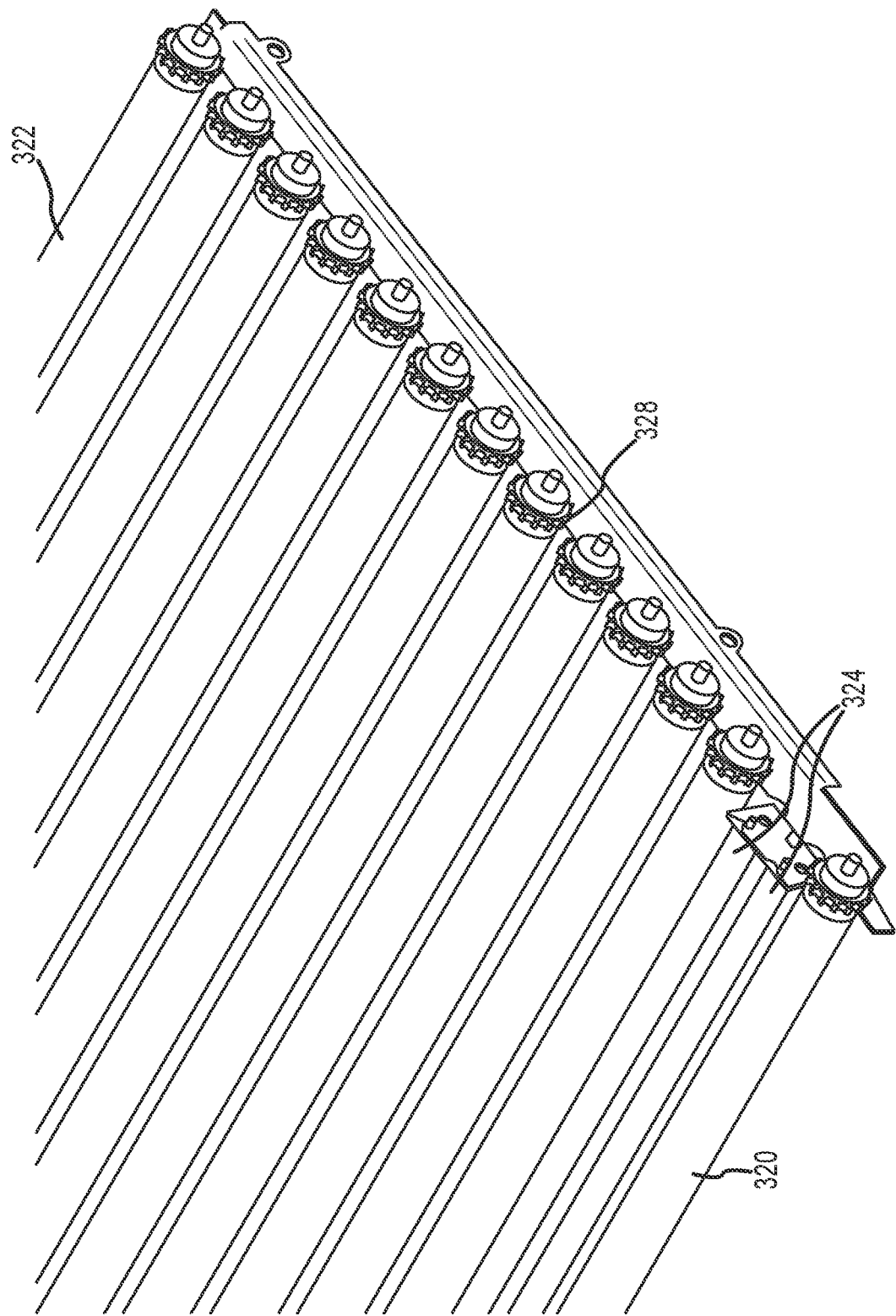
FIG. 13 is a right top perspective view of FIG. 12 with certain components removed.

FIGS. 6-13 show various views of raised belt transfer unit 300 and components thereof. FIG. 6 is a top right perspective view; FIG. 7 is a front view, FIG. 8 is a right plan view; FIG. 9 is a top plan view; FIG. 10 is a right side sectional view along line A-A shown in FIG. 9; FIG. 11 is a right side sectional view along line B-B shown in FIG. 9; FIG. 12 is a right top perspective view of FIG. 6 with certain components removed; and FIG. 13 is a right top perspective view of FIG. 12 with certain components removed. Other embodiments may include more or fewer components.

Raised belt transfer unit 300 receives material and transports the material either from the telescopic conveyor 202 or to the telescopic conveyor 202. Broadly, raised belt transfer unit 300 comprises roller bed 318 mounted to first angled support 304 and second angled support 306.

Roller bed 318 may comprise a drive roller 320, driven rollers 322 and, in some instances, one or more passive rollers 324. Various implementations may comprise different quantities of rollers in roller bed 318. A quantity of rollers in roller bed 318 may be adjusted to achieve various goals of a particular implementation. Accordingly, the number of rollers in the embodiment shown is not limiting, and different numbers of rollers are contemplated. Roller bed 318 is not defined as including guide roller 326, which is discussed in greater detail below.

Different implementations may have roller bed 318 oriented at a variety of incline angles, which may be selected based upon a particular application. In some instances, roller bed 318 may have an incline angle between 8° and 20°; between 10° and 20°; between 15° and 20°; between 8° and 15°; between 8° and 10°; between 10° and 12°; or between 9° and 11°. In some instances, roller bed 318 may have an incline angle of at least 8°; at least 9°; at least 10°; at least 11°; at least 13°; at least 15°; at least 17°; or at least 19°. In some instances, roller bed 318 may have an incline angle of no more than 20°; no more than 18°; no more than 16°; no more than 14°; no more than 12°; no more than 11°; no more than 10°; or no more than 9°. Accordingly, the incline angle shown in the Figures is not limiting and different incline angles are contemplated.

First angled support 304 and second angled support 306 connect to telescopic conveyor 202 and support the rollers of raised belt transfer unit 300. Upper edges of first angled support 304 and second angled support 306 rise from lower end portion 308 and lower end portion 310, respectively, to a higher end portion 312, 314, respectively. Typically, rollers in roller bed 318 may be mounted adjacent the upper edges of first angled support 304 and second angled support 306. Typically, raised belt transfer unit 300 may be mounted to telescopic conveyor 202 adjacent the lower edges of first angled support 304 and second angled support 306.

When raised belt transfer unit 300 is connected to telescopic conveyor 202, drive roller 320 is arranged to be rotated by conveyor belt 214. In turn, rotation of drive roller 320 causes rotation of driven rollers 322 via drive connector 330.

As shown, drive roller 320 is positioned adjacent lower end portion 308 and lower end portion 310. Accordingly, drive roller 320 is positioned lower (i.e., closer to slider bed 206) than any of the driven rollers 322.

As shown, drive roller 320 has the same diameter as driven rollers 322, although the drive roller 320 diameter may be larger or smaller in other embodiments. In some instances, drive roller 320 may further comprise a coating on an outer surface of drive roller 320. The coating may extend around the circumference of the drive roller 320. In some instances, exemplary coatings may increase friction between drive roller 320 and conveyor belt 214. In some instances, exemplary coatings may be polyurethane coatings. In some instances, a coating on a drive roller 320 may be between 1 millimeter thick and 5 millimeters thick.

When raised belt transfer unit 300 is connected to telescopic conveyor 202, guide roller 326 is in communication with conveyor belt 214 and routes conveyor belt 214 beneath driven rollers 322. To aid in re-routing conveyor belt 214, guide roller 326 is positioned lower than drive roller 320. Guide roller 326 is usually not arranged to be in communication with drive connector 330 and is also not considered part of roller bed 318.

As shown, the positioning of guide roller 326 may not be low enough to allow space for a similarly-sized driven roller 322 adjacent drive roller 320. Further, because guide roller 326 is positioned lower than drive roller 320, a gap would exist between drive roller 320 and an adjacent driven roller 322. Accordingly, in some instances, roller bed 318 may include one or more passive rollers 324 that "fill in" roller surfaces where a gap may otherwise exist.

As shown, passive rollers 324 are positioned adjacent drive roller 320 and guide roller 326. As used herein, "passive" indicates that passive rollers 324 are not in communication with drive connector 330. Passive rollers 324 may freely rotate in either direction and are positioned such that an upper surface of passive rollers 324 is generally aligned with upper surfaces of drive roller 320 and driven rollers 322.

In the embodiment shown, passive rollers 324 are smaller than drive roller 320 and driven rollers 322. Put another way, a diameter of passive rollers 324 is less than an average diameter of the driven rollers 322 or the diameter of drive roller 320.

Roller bed 318 comprises a plurality of driven rollers 322 that rotate in the same direction as drive roller 320 and are indirectly powered by conveyor belt 214. As shown, each roller between passive rollers 324 and the rollers adjacent the higher end portions of the first and second supports, 312 and 314 respectively, is a driven roller 322. However, other implementations may have one or more passive rollers disposed among driven rollers 322.

Drive roller 320 communicates rotational power to driven rollers 322 via drive connecter 330. Drive connector 330 is in communication with drive roller 320 and a driven roller 322. In some implementations, drive connector 330 is in communication with drive roller 320 and a plurality of driven rollers 322.

Drive connecter 330 can cause rotation of the driven rollers 322 in either a counterclockwise direction or a clockwise direction. Accordingly, raised belt transfer unit 300 may be used for both unloading applications and loading applications.

Drive roller 320 and each driven roller 322 releasably connect to drive connecter via mating projections 328. Exemplary mating projections 328 include sprockets and the like. In various implementations, drive connector 330 may be a belt, such as a timing belt, a chain, and the like. The embodiment shown also comprises drive system cover 332 to cover drive connector 330 and mating projections 328.

Figure 14:
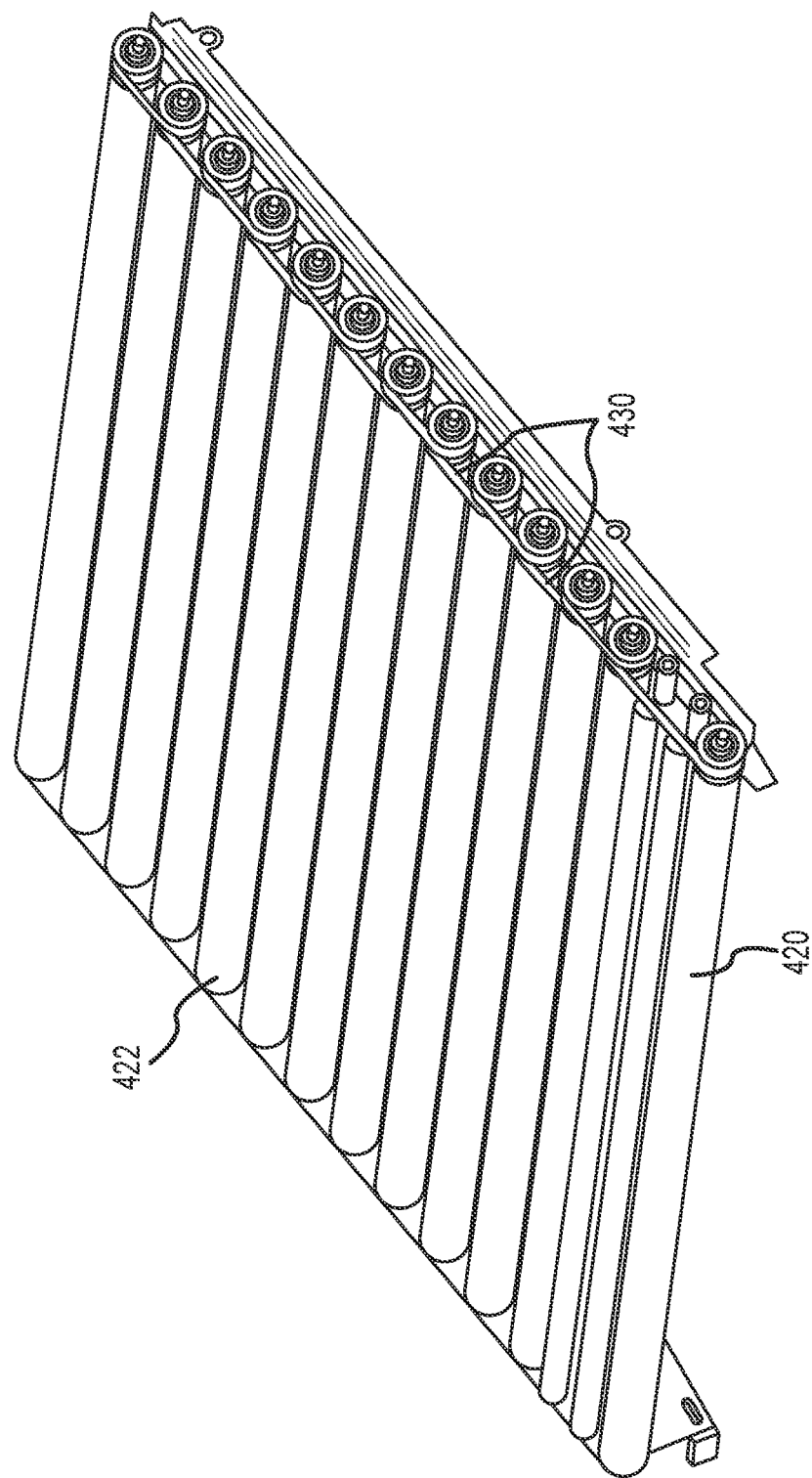
FIG. 14 shows a right top perspective view of a portion of a raised belt transfer unit with various components removed for clarity.

FIG. 14 shows a right top perspective view of a portion of a raised belt transfer unit with various components removed for clarity. As shown, drive roller 420 and driven rollers 422 are connected by a plurality of v-belts 430. Each v-belt 430 connects two driven rollers 422 or drive roller 420 and one driven roller 422. As shown, the plurality of v-belts 430 form a daisy chain.

Broadly, the exemplary v-belts 430 are continuous and have one generally flat surface and an opposite surface with one or more v-shaped extensions or ribs. Exemplary v-belts 430 may be made of various materials commonly used in the art.

Figure 15:
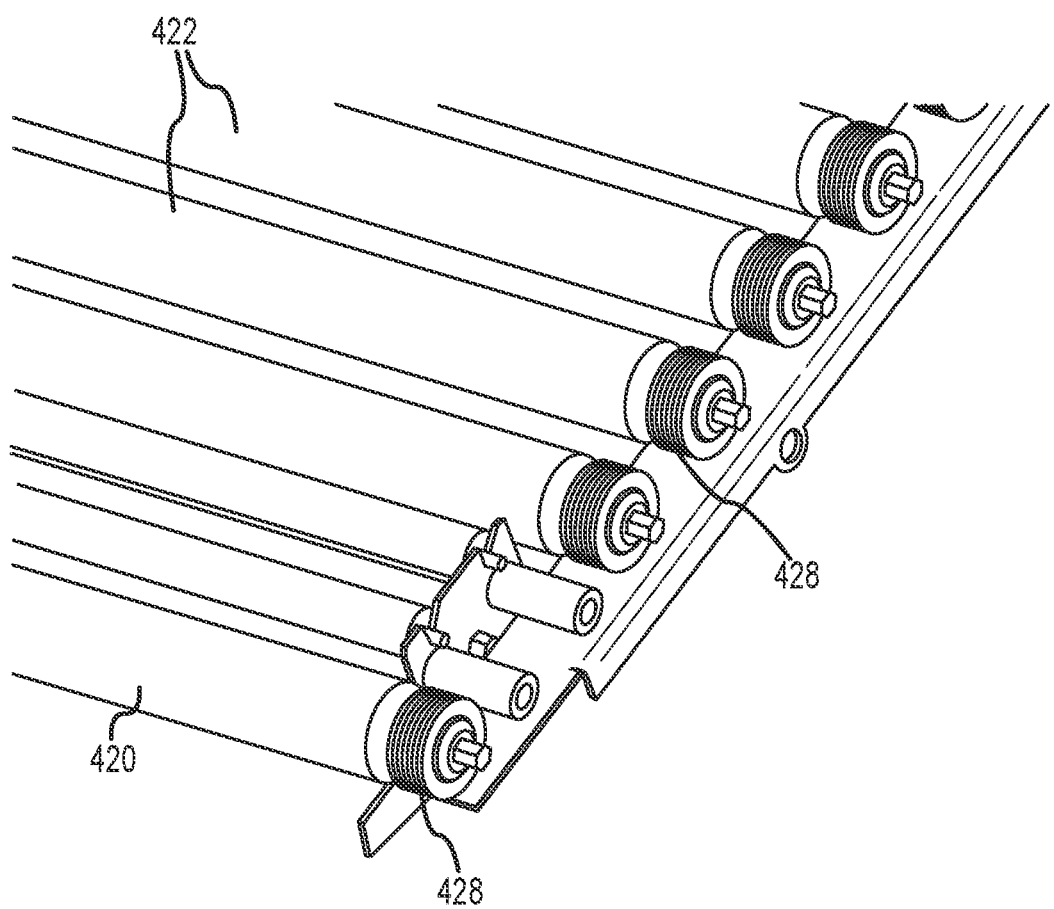
FIG. 15 shows a portion of FIG. 14 with v-belts removed.

FIG. 15 shows a portion of FIG. 14 with v-belts 430 removed. As shown, drive roller 420 and driven rollers 422 comprise a plurality of grooves 428. Each v-belt 430 mates with some of grooves 428. With the exception the top-most driven roller 422 (and the drive roller 420), each driven roller 422 is connected to the adjacent driven roller 422 by two different v-belts 430.

Figure 16:
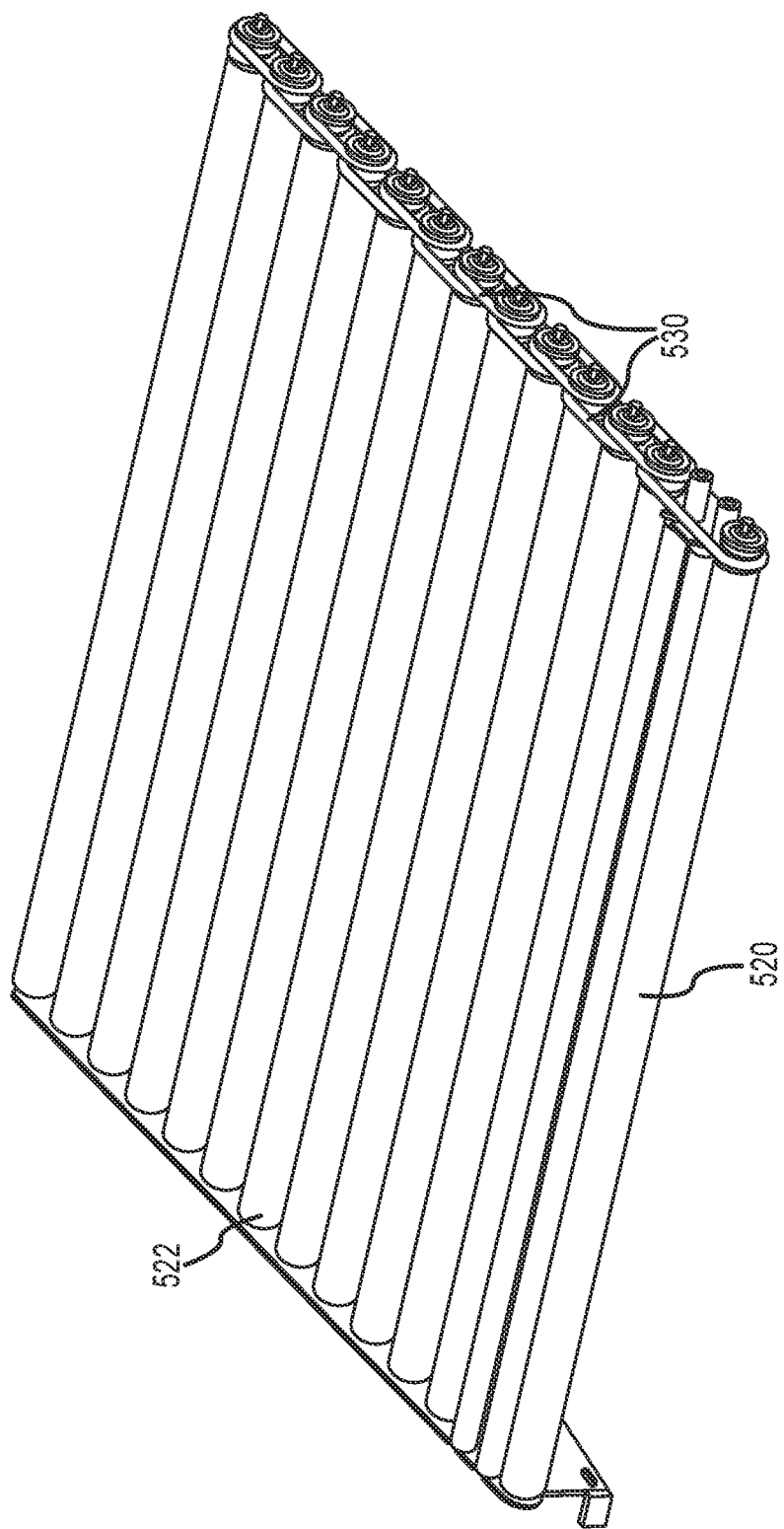
FIG. 16 shows a right top perspective view of a portion of a raised belt transfer unit with certain components removed for clarity.

FIG. 16 shows a right top perspective view of a portion of a raised belt transfer unit with certain components removed for clarity. As shown, drive roller 520 and driven rollers 522 are connected by a plurality of o-rings 530. Each o-ring 530 connects two driven rollers 522 or drive roller 520 and one driven roller 522. As shown, the plurality of o-rings 530 form a daisy chain.

Broadly, the exemplary o-rings 530 are continuous and have one generally two flat surfaces or a circular cross-section. Exemplary o-rings 530 may be made of various materials commonly used in the art.

Figure 17:
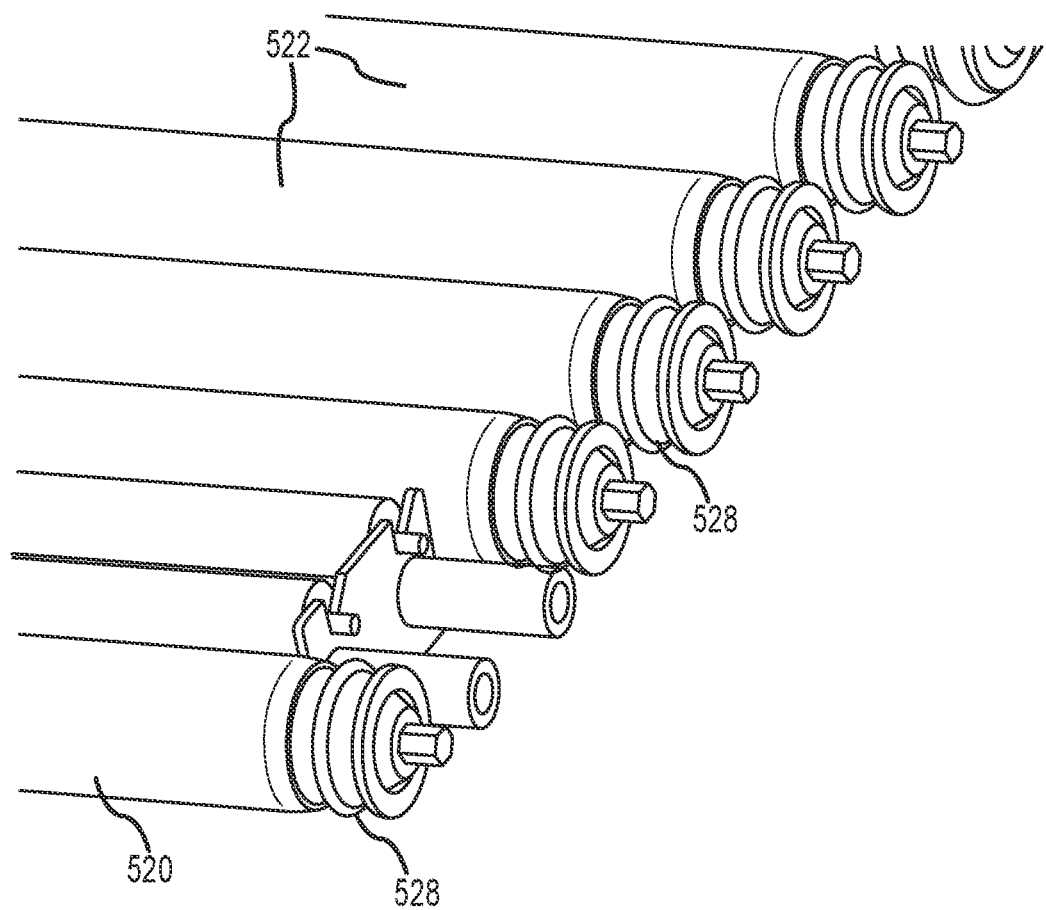
FIG. 17 shows a portion of FIG. 16 with o-rings removed.

FIG. 17 shows a portion of FIG. 16 with o-rings 530 removed. Drive roller 520 and driven rollers 522 comprise a plurality of grooves 528. Each v-belt 530 mates with a groove 528 on adjacent rollers. With the exception the top-most driven roller 522, each driven roller 522 is connected to the adjacent driven roller 522 by two different o-rings 530.

Figure 18:
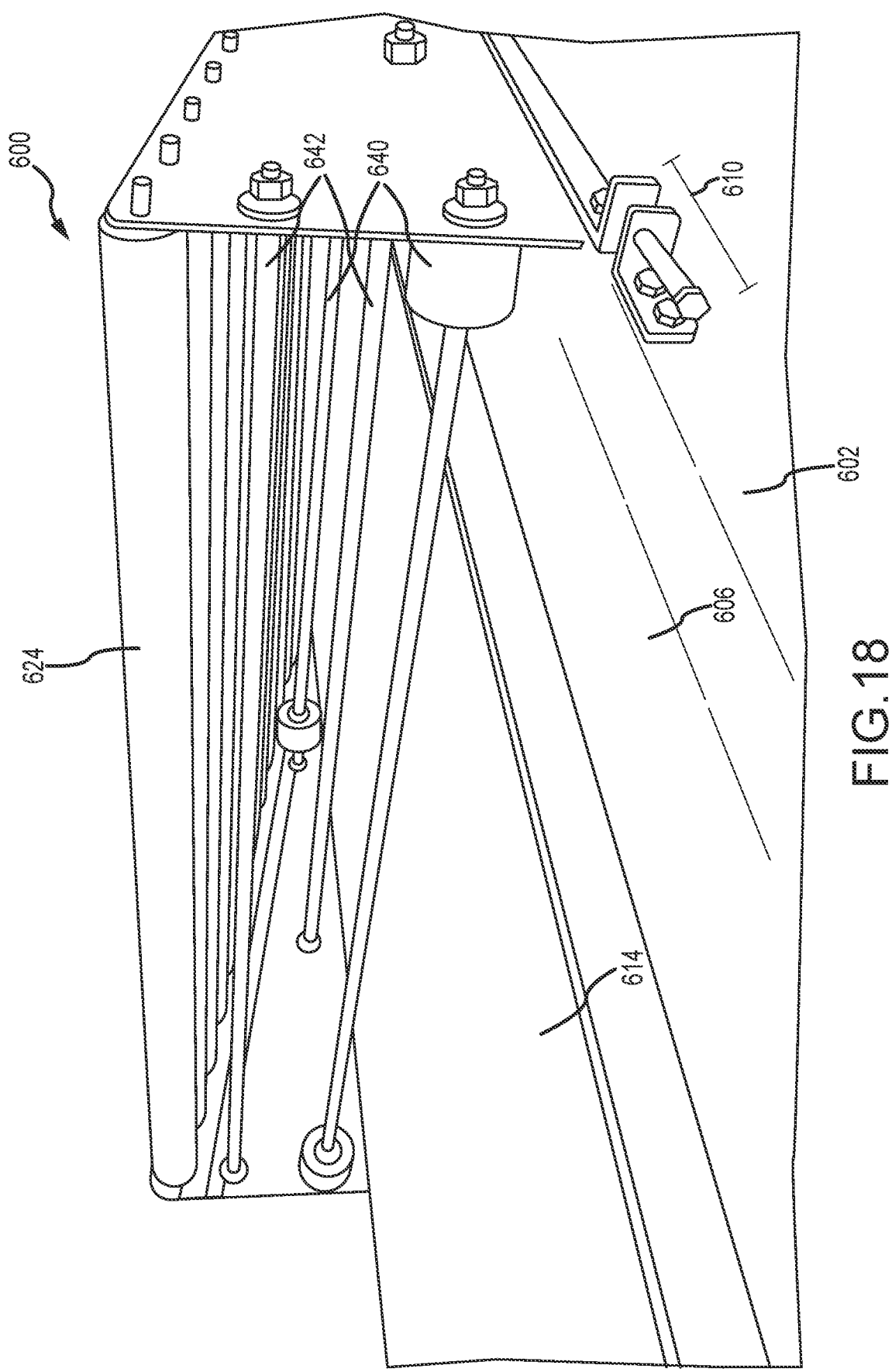
FIG. 18 is a photograph of an exemplary raised belt transfer unit, taken from a rear left side perspective.

FIG. 18 is a photograph of an exemplary raised belt transfer unit 600, taken from a rear left side perspective. Raised belt transfer unit 600 is connected to telescopic conveyor 602 via longitudinal adjustment assembly 610. Also visible in FIG. 18 are driven rollers 624 and lateral supports 640 and 642. Lateral supports 640 provide structure to raised belt transfer unit 600 and comprise rollers to assist in longitudinal adjustments to the raised belt transfer unit.

Lateral supports 642 comprise one or more rigid members connected to the first support assembly and the second support assembly.

Various embodiments of telescopic conveyor system 200 may be used to implement an example method for conveying material from a load site to a delivery site. The example method may begin by receiving material on a slider bed of a telescopic conveyor. The material is then conveyed on a conveyor belt of the telescopic conveyor to a raised belt transfer unit. The material is then provided to the raised belt transfer unit. In some embodiments, the raised belt transfer unit comprises a first angled support and a second angled support, a drive roller rotatably mounted to the first angled support and the second angled support, a plurality of driven rollers rotatably mounted to the first angled support and the second angled support, and a drive connecter in communication with the drive roller and at least one of the plurality of driven rollers. The drive roller may be positioned adjacent a lower end of the first support and a lower end of the second support and the drive roller is coupled to the conveyor belt. The example method may also comprise providing the material from the raised belt transfer unit to a secondary conveyor, which may be an incline conveyor.

Various embodiments of telescopic conveyor system 200 may be used to implement an example method for conveying material from a first location to a load site. The example method may begin by receiving material on a raised belt transfer unit from a first conveyor. In some embodiments, the raised belt transfer unit comprises a first angled support and a second angled support, a drive roller rotatably mounted to the first angled support and the second angled support, a plurality of driven rollers rotatably mounted to the first angled support and the second angled support, and a drive connecter in communication with the drive roller and at least one of the plurality of driven rollers. The drive roller may be positioned adjacent a lower end of the first support and a lower end of the second support and the drive roller may be coupled to a conveyor belt. Then material may be provided from the raised belt transfer unit to the telescopic conveyor. The telescopic conveyor is positioned lower than the first conveyor, that is, closer to a floor or other support surface. The material is received on the conveyor belt of the telescopic conveyor and conveyed to the loading site on the conveyor belt.

Although the present disclosure has been described in detail with reference to certain embodiments, variations and modifications exist within the scope and spirit of one or more independent aspects of the present disclosure as described.

Embodiments

Embodiments of the present disclosure are disclosed in the following clauses:

Embodiment 1. A raised belt transfer unit, comprising:
    a first angled support and a second angled support;
    a drive roller rotatably mounted to the first angled support and the second angled support;
    a plurality of driven rollers rotatably mounted to the first angled support and the second angled support; and
    a drive connecter in communication with the drive roller and a driven roller,
        the drive roller adjacent a lower end of the first support and adjacent a lower end of the second support; and
        the drive roller being adapted to be coupled to a conveyor belt.

Embodiment 2. The raised belt transfer unit according to Embodiment 1, wherein the drive roller is lower than any of the driven rollers.

Embodiment 3. The raised belt transfer unit according to Embodiment 1 or Embodiment 2, further comprising passive rollers adjacent the drive roller;
wherein a passive roller diameter is smaller than an average diameter of the driven rollers.

Embodiment 4. The raised belt transfer unit according to Embodiment 3, further comprising a guide roller adjacent the passive rollers and such that the guide roller is in communication with the conveyor belt; and
wherein the passive rollers are not in communication with the drive connector.

Embodiment 5. The raised belt transfer unit according to any one of Embodiments 1-4, wherein each of the plurality of driven rollers includes mating projections that releasably couple to the drive connector.

Embodiment 6. The raised belt transfer unit according to Embodiment 5, wherein the mating projections are sprockets.

Embodiment 7. The raised belt transfer unit according to any one of Embodiments 1-6, wherein the drive connector comprises a belt.

Embodiment 8. The raised belt transfer unit according to any one of Embodiments 1-7, wherein the drive connector comprises a chain.

Embodiment 9. The raised belt transfer unit according to Embodiment 8, wherein the drive connector is in communication with a plurality of driven rollers.

Embodiment 10. The raised belt transfer unit according to any one of Embodiments 1-9, wherein the drive roller further comprises a coating on an exterior surface of the drive roller.

Embodiment 11. A telescopic conveyor system, comprising:
a telescopic conveyor comprising a conveyor belt; and
a raised belt transfer unit mounted to the telescopic conveyor, the raised belt transfer unit comprising:
a first angled support and a second angled support;
a drive roller rotatably mounted to the first angled support and the second angled support;
a plurality of driven rollers rotatably mounted to the first angled support and the second angled support; and
a drive connecter in communication with the drive roller and at least one of the plurality of driven rollers,
the drive roller being adjacent a lower end of the first support and a lower end of the second support; and
the drive roller being coupled to the conveyor belt.

Embodiment 12. The telescopic conveyor system according to Embodiment 11, wherein the conveyor belt rises no more than 5 cm above a slider bed of the telescopic conveyor when passing into the raised belt transfer unit.

Embodiment 13. The telescopic conveyor system according to Embodiment 11 or Embodiment 12, wherein the raised belt transfer unit is connected to sides of the telescopic conveyor.

Embodiment 14. The telescopic conveyor system according to Embodiment 13, further comprising a longitudinal adjustment assembly configured to adjust a longitudinal position of the raised belt transfer unit relative to the telescopic conveyor.

Embodiment 15. The telescopic conveyor system according to any one of Embodiments 11 to 14, wherein the conveyor belt passes over the drive roller and under a guide roller.

Embodiment 16. The telescopic conveyor system according to any one of Embodiments 11 to 15, wherein the drive connector comprises a belt.

Embodiment 17. The telescopic conveyor system according to any one of Embodiments 11 to 16, wherein the drive connector can cause rotation of the plurality of driven rollers in either a counterclockwise direction or a clockwise direction.

Embodiment 18. A method for conveying material from a load site to a delivery site with a telescopic conveyor system, the method comprising:
receiving material on a slider bed of a telescopic conveyor in the telescopic conveyor system;
conveying the material, on a conveyor belt of the telescopic conveyor, to a raised belt transfer unit;
providing the material to a raised belt transfer unit, the raised belt transfer unit comprising:
a first angled support and a second angled support;
a drive roller rotatably mounted to the first angled support and the second angled support;
a plurality of driven rollers rotatably mounted to the first angled support and the second angled support; and
a drive connecter in communication with the drive roller and a driven roller,
the drive roller being adjacent a lower end of the first support and a lower end of the second support; and
the drive roller being coupled to the conveyor belt; and
providing the material from the raised belt transfer unit to a secondary conveyor.

Embodiment 19. A method for conveying material from a first location to a loading site with a telescopic conveyor, the method comprising:
receiving material on a raised belt transfer unit from a first conveyor, the raised belt transfer unit comprising:
a first angled support and a second angled support;
a drive roller rotatably mounted to the first angled support and the second angled support;
a plurality of driven rollers rotatably mounted to the first angled support and the second angled support; and
a drive connecter in communication with the drive roller and a driven roller,
the drive roller being adjacent a lower end of the first support and a lower end of the second support; and
the drive roller being coupled to a conveyor belt of a telescopic conveyor;
providing the material from the raised belt transfer unit to the telescopic conveyor, the telescopic conveyor being lower than the first conveyor;
receiving the material on the conveyor belt of the telescopic conveyor; and
conveying the material, on the conveyor belt, to the loading site.

The invention claimed is:

1. A raised belt transfer unit, comprising:
a first angled support and a second angled support, each of the first angled support and the second angled support including upper edges that rise from a lower end portion to a higher end portion;
a drive roller rotatably mounted to the first angled support and the second angled support;
a plurality of driven rollers rotatably mounted to the first angled support and the second angled support; and
a drive connecter in communication with the drive roller and a driven roller,
the drive roller adjacent the lower end portion of the first angled support and adjacent the lower end portion of the second angled support; and the drive roller adapted to be coupled to a conveyor belt and driven by the conveyor belt.

2. The raised belt transfer unit according to claim 1, wherein the drive roller is lower than all of the driven rollers.

3. The raised belt transfer unit according to claim 2, further comprising passive rollers adjacent the drive roller, wherein a passive roller diameter is smaller than an average diameter of the driven rollers.

4. The raised belt transfer unit according to claim 3, further comprising a guide roller adjacent the passive rollers, and such that the guide roller is in communication with the conveyor belt; and
wherein the passive rollers are not in communication with the drive connector.

5. The raised belt transfer unit according to claim 1, wherein each of the plurality of driven rollers includes mating projections that releasably couple to the drive connector.

6. The raised belt transfer unit according to claim 5, wherein the mating projections are sprockets.

7. The raised belt transfer unit according to claim 1, wherein the drive connector comprises a belt.

8. The raised belt transfer unit according to claim 1, wherein the drive connector comprises a chain.

9. The raised belt transfer unit according to claim 8, wherein the drive connector is in communication with a plurality of driven rollers.

10. The raised belt transfer unit according to claim 1, wherein the drive roller further comprises a coating on an exterior surface of the drive roller.

11. A telescopic conveyor system, comprising:
a telescopic conveyor comprising a conveyor belt;
a raised belt transfer unit mounted to the telescopic conveyor, the raised belt transfer unit comprising:
    a first angled support and a second angled support, each of the first angled support and the second angled support including upper edges that rise from a lower end portion to a higher end portion;
    a drive roller rotatably mounted to the first angled support and the second angled support;
    a plurality of driven rollers rotatably mounted to the first angled support and the second angled support; and
    a drive connecter in communication with the drive roller and at least one of the plurality of driven rollers,
        the drive roller adjacent the lower end portion of the first angled support and the lower end portion of the second angled support; and
        the drive roller being coupled to the conveyor belt and driven by the conveyor belt.

12. The telescopic conveyor system according to claim 11, wherein a rise of the conveyor belt is no more than 5 cm above a slider bed of the telescopic conveyor when passing into the raised belt transfer unit.

13. The telescopic conveyor system according to claim 12, wherein the raised belt transfer unit is connected to sides of the telescopic conveyor.

14. The telescopic conveyor system according to claim 13, further comprising a longitudinal adjustment assembly configured to adjust a longitudinal position of the raised belt transfer unit relative to the telescopic conveyor.

15. The telescopic conveyor system according to claim 11, wherein the conveyor belt passes over the drive roller and under a guide roller.

16. The telescopic conveyor system according to claim 11, wherein the drive connector comprises a belt.

17. The telescopic conveyor system according to claim 11, wherein the drive connector can cause rotation of the plurality of driven rollers in either a counterclockwise direction or a clockwise direction.

18. A method for conveying material with a telescopic conveyor system, the method comprising:
receiving material on a slider bed of a telescopic conveyor in the telescopic conveyor system;
conveying the material, on a conveyor belt of the telescopic conveyor, to a raised belt transfer unit;
providing the material to a raised belt transfer unit, the raised belt transfer unit comprising:
    a first angled support and a second angled support, each of the first angled support and the second angled support including upper edges that rise from a lower end portion to a higher end portion;
    a drive roller rotatably mounted to the first angled support and the second angled support;
    a plurality of driven rollers rotatably mounted to the first angled support and the second angled support; and
    a drive connecter in communication with the drive roller and a driven roller,
        the drive roller adjacent the lower end portion of the first angled support and the lower end portion of the second angled support; and
        the drive roller being coupled to the conveyor belt and driven by the conveyor belt; and
providing the material from the raised belt transfer unit to a secondary conveyor.

19. The method according to claim 18, further comprising:
receiving material on the raised belt transfer unit from the secondary conveyor;
providing the material from the raised belt transfer unit to the telescopic conveyor, the telescopic conveyor being lower than the first conveyor;
receiving the material on the conveyor belt of the telescopic conveyor; and
conveying the material, on the conveyor belt, to a loading site.

* * * * *